US008567436B2

(12) United States Patent
Polgati et al.

(10) Patent No.: US 8,567,436 B2
(45) Date of Patent: Oct. 29, 2013

(54) HYDRAULIC CONNECTION ASSEMBLY WITH A PRESSURE DISCHARGE CONTROL, POSITIONABLE BETWEEN AN ONBOARD HYDRAULIC CIRCUIT OF AN ENGINEERING VEHICLE AND A REMOVABLE HYDRAULIC EQUIPMENT

(75) Inventors: Igor Polgati, Agnadello (IT); Andrea Ursella, Bergamo (IT)

(73) Assignee: Stucchi S.p.A., Brignano Gera d'Adda (BG) (IT)

( * ) Notice: Subject to any disclaimer, the term of this patent is extended or adjusted under 35 U.S.C. 154(b) by 1034 days.

(21) Appl. No.: 12/309,408

(22) PCT Filed: Jul. 24, 2007

(86) PCT No.: PCT/EP2007/057593
§ 371 (c)(1),
(2), (4) Date: Sep. 29, 2009

(87) PCT Pub. No.: WO2008/012293
PCT Pub. Date: Jan. 31, 2008

(65) Prior Publication Data
US 2010/0024902 A1     Feb. 4, 2010

(30) Foreign Application Priority Data
Jul. 25, 2006    (IT) .............................. MI2006A1456

(51) Int. Cl.
*F16K 21/00*     (2006.01)
(52) U.S. Cl.
USPC ........................................ 137/596.2; 137/595
(58) Field of Classification Search
USPC ........ 137/614.02–614.04, 595, 596.2, 599.02
See application file for complete search history.

(56) References Cited

U.S. PATENT DOCUMENTS 3,693,655 A    9/1972   Frisk
6,840,276 B2 *   1/2005   Zeiber et al. ............. 137/614.03
(Continued)

FOREIGN PATENT DOCUMENTS

DE    199 38 876     3/2001
WO    2004/070241    8/2004

OTHER PUBLICATIONS

International Search Report issued Nov. 30, 2007 in International (PCT) Application No. PCT/EP2007/057593.
Patent Cooperation Treaty (PCT) International Preliminary Report on Patentability, issued Jun. 10, 2008 in International Application No. PCT/EP2007/057593.

(Continued)

*Primary Examiner* — Kevin Lee
(74) *Attorney, Agent, or Firm* — Wenderoth, Lind & Ponack, L.L.P.

(57) ABSTRACT

A hydraulic assembly comprises a one-piece body attachable to the outside of the hydraulic machine near the hydraulic equipment and provided with at least one input hydraulic linkage connectable to a pressure line of the hydraulic circuit of the vehicle, at least one coupling suitable for the connection with a feeding input of a removable equipment and a pressure discharge hydraulic linkage connectable to a draining line, at least one normally closed discharge valve positioned between the linkage to a pressure line and the linkage to a draining line and a pressure discharge control operable so as to cause the opening of the at least one normally closed valve for the connection the pressure line to the draining line for discharging the pressure existing in the hydraulic circuit of the vehicle. The discharge valve is of the sliding piston type and the pressure discharge control is formed by a lever rotatable around a transversal axis between a stable resting position and a working position in which a side of the lever exerts an axial thrust on the sliding piston for the opening control of the valve.

16 Claims, 6 Drawing Sheets

(56) References Cited

U.S. PATENT DOCUMENTS

| | | |
|---|---|---|
| 6,840,279 B2 * | 1/2005 | Sulzyc et al. ................. 137/595 |
| 7,389,794 B2 * | 6/2008 | Knuthson ................. 137/614.02 |
| 8,205,641 B2 * | 6/2012 | Richardson et al. .......... 137/883 |
| 2004/0144436 A1 | 7/2004 | Zeiber et al. |
| 2006/0130910 A1 | 6/2006 | Knuthson |

OTHER PUBLICATIONS

Patent Cooperation Treaty (PCT) Written Opinion of the International Searching Authority, issued Nov. 30, 2007 in International Application No. PCT/EP2007/057593.

* cited by examiner

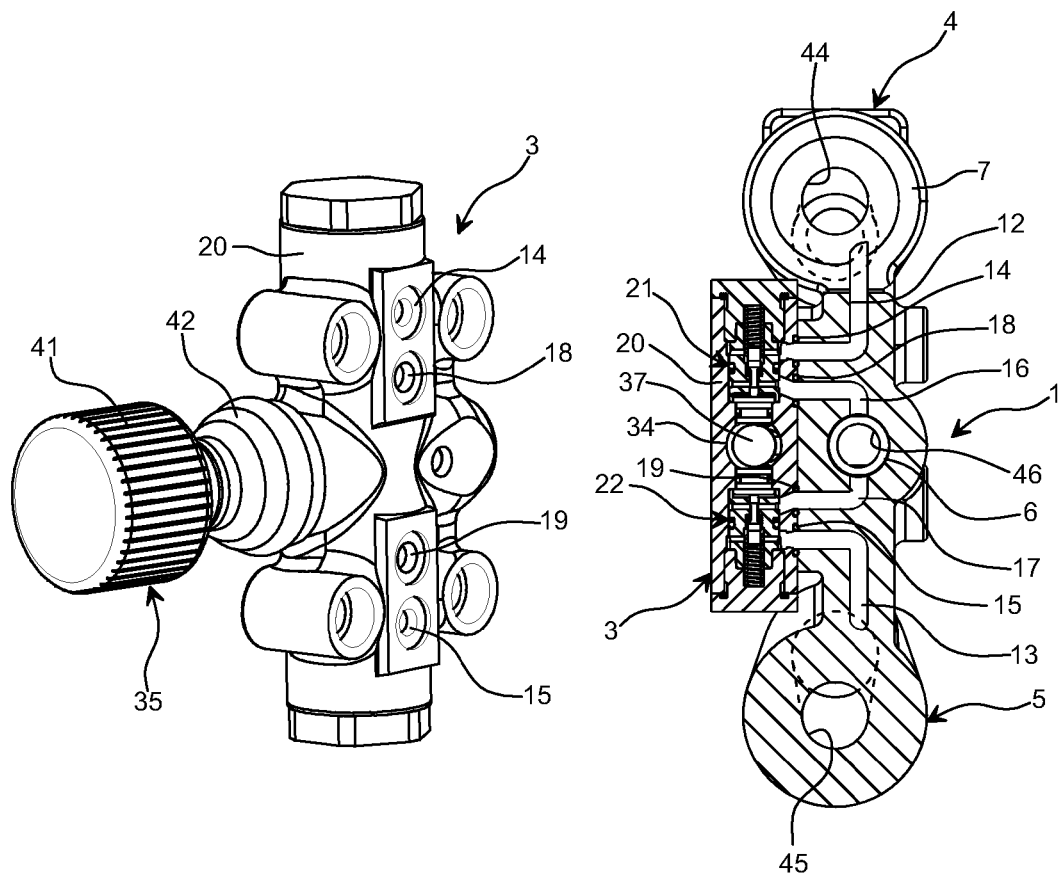
Fig. 6
Fig. 4
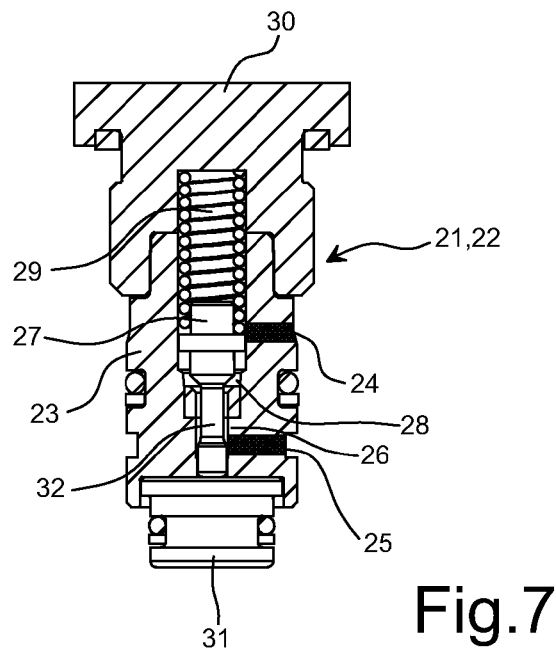
Fig. 7

HYDRAULIC CONNECTION ASSEMBLY WITH A PRESSURE DISCHARGE CONTROL, POSITIONABLE BETWEEN AN ONBOARD HYDRAULIC CIRCUIT OF AN ENGINEERING VEHICLE AND A REMOVABLE HYDRAULIC EQUIPMENT

BACKGROUND OF THE INVENTION

I. Field of the Invention

The present invention relates to a hydraulic connection assembly with a pressure discharge control, which is positionable between an onboard hydraulic circuit of an engineering vehicle and removable hydraulic equipment.

II. Description of the Related Art

Engineering vehicles with onboard hydraulic circuits (excavators, front loaders, etc.) usually have the ability of connecting the circuit itself to removable hydraulic equipment (for instance, hammers, miller cutter, etc.) by means of the connection of flexible hoses and rapid couplings.

In some vehicles, the hydraulic system may remain in residual pressure when the equipment is disconnected.

It is therefore required to firstly connect or disconnect the equipment, discharge the pressure of the onboard hydraulic system, by means of manoeuvres to be performed on the controls of the engineering vehicle.

That is, it is required to leave the post near the equipment, enter the control post of the engineering vehicle and discharge the pressure; then the equipment is approached and its connection or disconnection is performed by means of manual rapid coupling.

Alternatively, the operation may be performed by two people, thus increasing the costs of the operation.

Without these operations, the connection or disconnection of the hydraulic equipment is impossible or dangerous.

WO-A-2004/070241 describes a hydraulic assembly, positionable between the engineering vehicle and the removable equipment. Such a hydraulic assembly has a one-piece body including hydraulic linkages to pressure lines of the hydraulic circuit of the vehicle and to corresponding feeding inputs for removable equipment, a hydraulic linkage to a draining line, normally closed discharge valves positioned between the linkages to pressure lines and the linkage to a draining line and a control for the pressure discharge which is operable so as to cause the opening of one and/or the other of the normally closed valves for the connection of the above the pressure lines to the draining line for the discharge of the pressure existing in the hydraulic circuit of the vehicle.

The two valves are ball valves and the pressure discharge control consists of a knob rotatable around its longitudinal axis in order to allow one or more cam surfaces of a rod thereof to act on the control ball of one and/or the other of the above the valves to cause the opening thereof.

SUMMARY OF THE INVENTION

It is the object of the present invention to make a hydraulic assembly positionable between an onboard hydraulic circuit of an engineering vehicle and removable hydraulic equipment, in which a different and more efficient and safe pressure discharge control is provided.

According to the invention such an object is achieved by a hydraulic assembly comprising a one-piece body attachable to the outside of the hydraulic machine near the hydraulic equipment and provided with at least one hydraulic input linkage connectable to a pressure line of the hydraulic circuit of the vehicle, at least one suitable coupling for the connection with a feeding input of a removable equipment and a hydraulic pressure discharge linkage connectable to a draining line, at least one normally closed discharge valve positioned between the linkage to a pressure line and the linkage to a draining line and a pressure discharge control operable so as to cause the opening of the at least one normally closed valve for the connection of the above the pressure line to the draining line for the discharge of the pressure existing in the hydraulic circuit of the vehicle, characterised in that the discharge valve is of the sliding piston-type and the pressure discharge control is formed by a lever rotatable around a transversal axis between a stable resting position and a working position in which a side of the lever exerts an axial thrust on the sliding piston for the opening control of the valve.

In this manner there are ensured the stable and safe positioning of the control lever and of the discharge valve in the normal resting position to ensure the correct connection between the onboard hydraulic circuit and the removable equipment, and at the same time a simple and convenient transversal displacement of the lever allows to perform a precise and safe opening intervention of the valve by means of an axial thrust on its sliding piston.

Preferably there is provided the possibility to also lead the working position of the pressure discharge lever to be stable for the whole time required for the discharge of the pressure of the hydraulic circuit of the vehicle.

Furthermore, it may be arranged for the one-piece body to have two linkages to pressure lines and two couplings for the connection to removable equipment, and for two discharge valves operated by a single pressure discharge lever to accordingly be provided, the lever having in this case a resting position and two working positions, preferably arranged symmetrically like the two discharge valves, the two linkages and the two couplings.

BRIEF DESCRIPTION OF THE DRAWINGS

The features of the present invention will become more apparent from the following detailed description of possible embodiments thereof shown by way of non-limitative example in the accompanying drawings, in which:

FIG. 4 shows a section view of the hydraulic assembly along line IV-IV in FIG. 2;

FIG. 6 shows a perspective view of an enlarged detail of the valve assembly included in the hydraulic assembly in FIGS. 1-4;

FIG. 7 shows the enlarged detail of a discharge valve included in the valve assembly in FIG. 6;

DETAILED DESCRIPTION OF THE INVENTION

Figure 1:
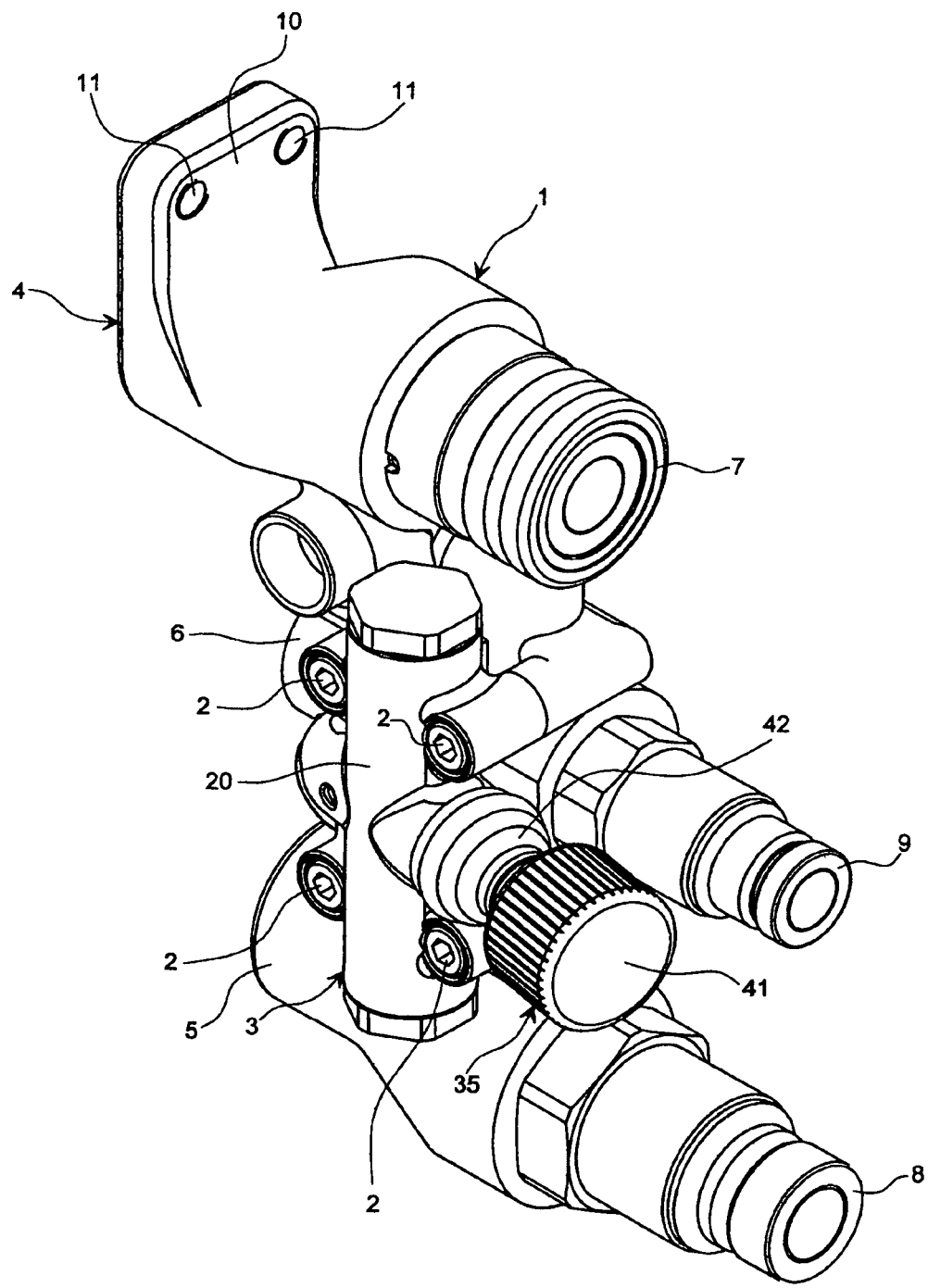
FIG. 1 shows a perspective view of a one-piece body hydraulic assembly according to the present invention with two linkages to pressure lines and two couplings for removable equipment.
Figure 2:
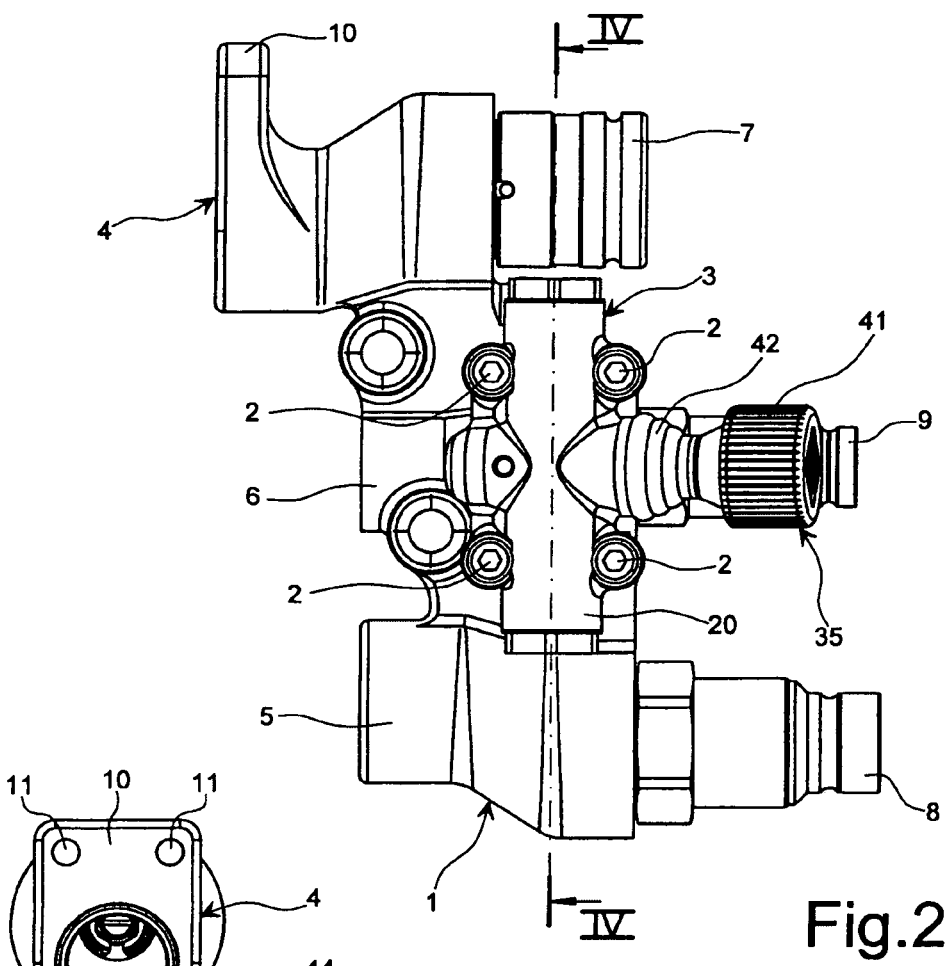
FIG. 2 shows a side view of the hydraulic assembly.
Figure 3:
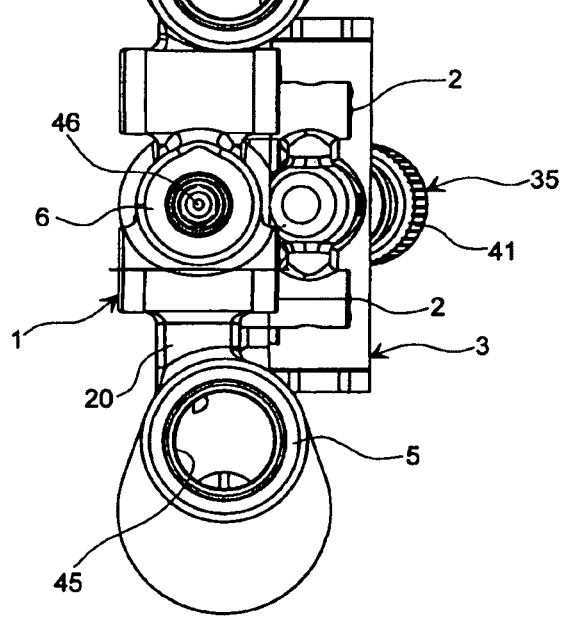
FIG. 3 shows an end view of the hydraulic assembly.

The hydraulic assembly shown in FIGS. 1-3 comprises a one-piece body 1 to which a valve assembly 3 is laterally attached in a detachable manner by means of screws 2.

Figure 5:
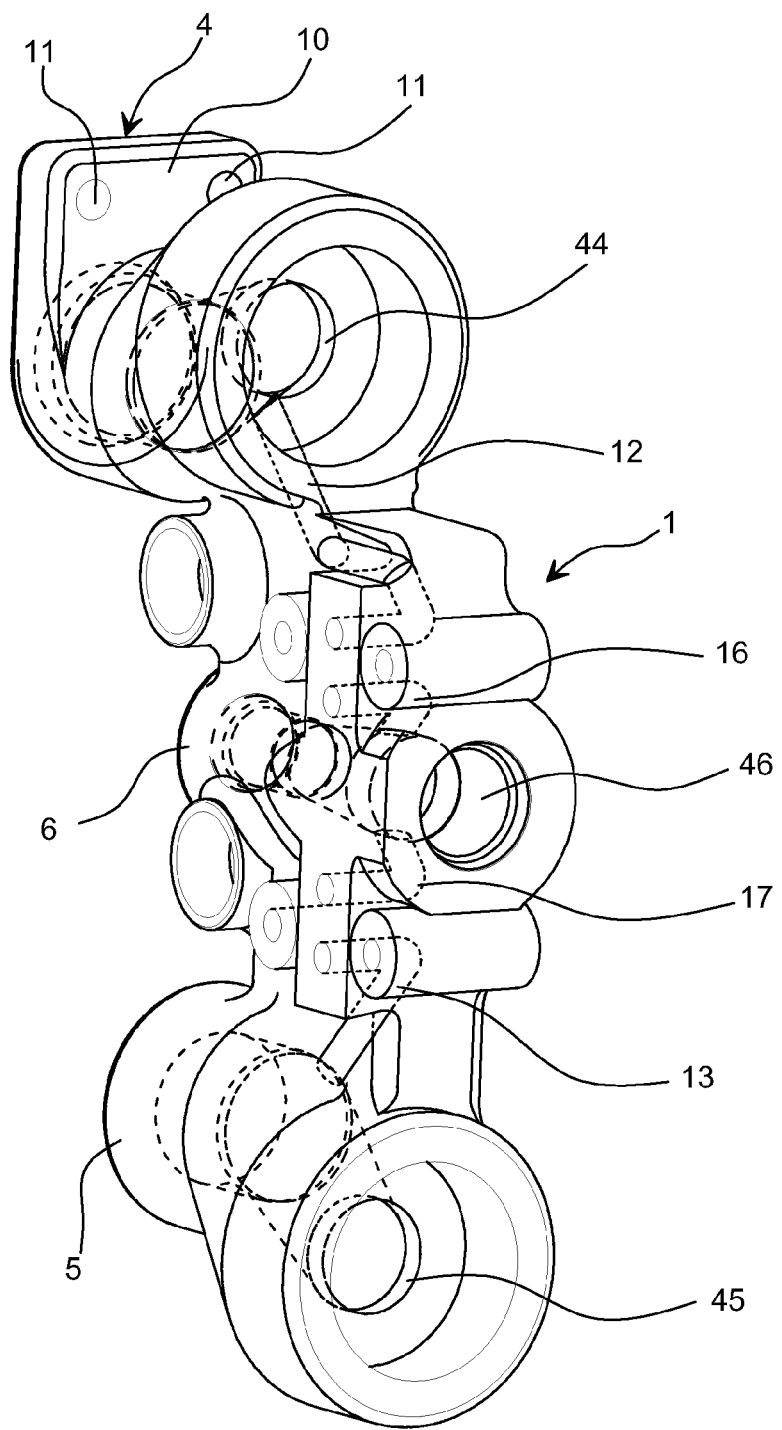
FIG. 5 shows a perspective view of the detail of the one-piece body included in the hydraulic assembly in FIGS. 1-4.

A one-piece body 1, shown in detail in FIG. 5, is intended for the hydraulic connection to an onboard hydraulic circuit of a hydraulic machine and for the attachment to the outside thereof near the removable equipment fed by the hydraulic circuit. For such a purpose, the one-piece body 1 comprises two end linkages 4 and 5 for the connection to respective pressure lines of the hydraulic circuit of the vehicle and an intermediate linkage 6 for the connection to a draining line of the hydraulic circuit itself, in turn connected to a hydraulic liquid tank, usually oil. Respective couplings 7 and 8 (preferably rapid couplings) for the connection to respective feeding inputs for removable equipment are arranged in front of the linkages 4 and 5 for the pressure lines and in direct hydraulic connection therewith by means of holes 44 and 45 and a coupling 9 (this preferably being a rapid coupling as well) for the connection to a possible draining output of the removable equipment is arranged in front of the linkage 6 for the draining line and in direct hydraulic connection therewith by means of a hole 46. At least one of the linkages 5 and 6 is provided with a side flange 10 provided with holes 11 for fastener screws for the mechanical attachment of the one-piece block 1 to the hydraulic machine.

Within the one-piece body 1 there are provided passages 12 and 13 (highlighted in black), which hydraulically connect the linkages 4 and 5 for pressure lines with respective inputs 14 and 15 of the valve assembly 3 and further passages 16 and 17 (highlighted in black), which hydraulically connect respective outputs 18 and 19 of the valve assembly 3 with the linkage 6 for the draining line (FIGS. 4, 5 and 6).

Figure 8:
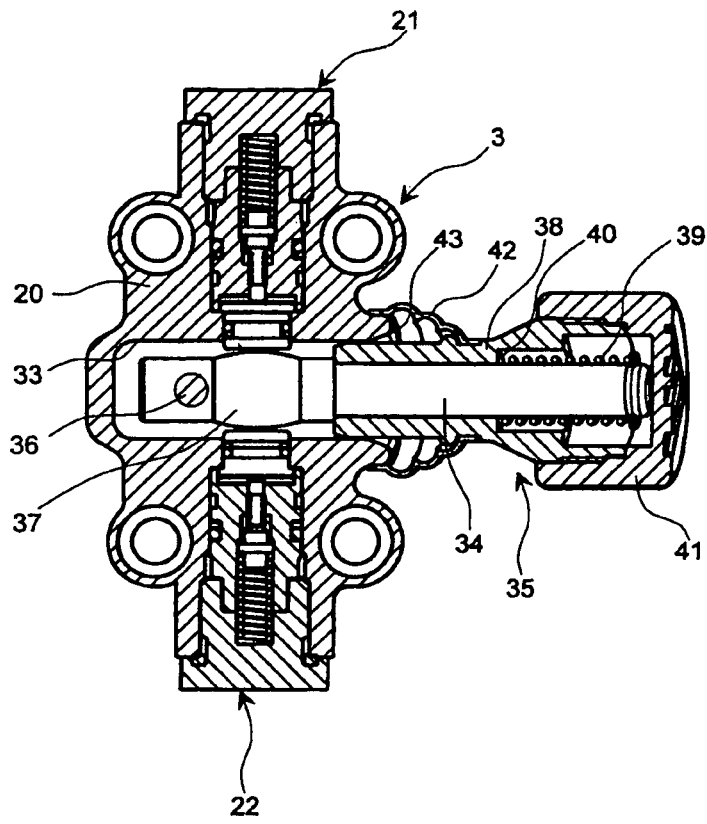
FIG. 8 shows an axial section view of the valve assembly with a control lever of the opening of the valves in a resting position.
Figure 9:
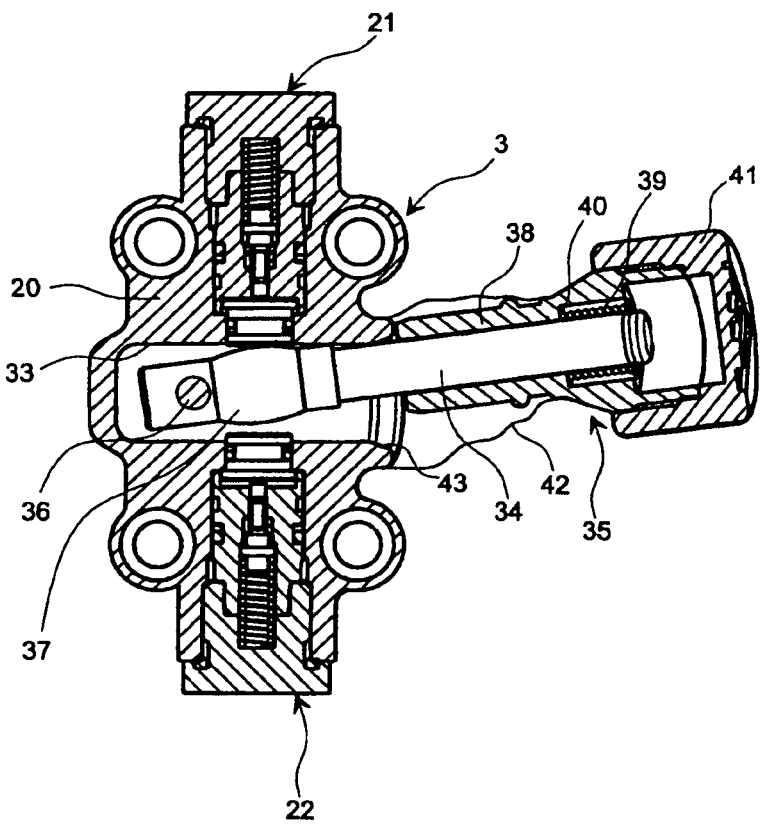
FIG. 9 shows an axial section view of the valve assembly with the opening control lever of the valves in an opening position of a discharge valve.
Figure 10:
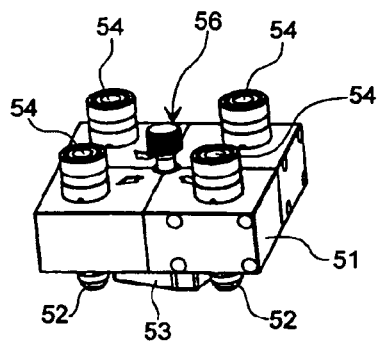
FIGS. 10 and 11 show different perspective views of a variant of the hydraulic assembly according to the present invention which provides for four linkages to pressure lines and four couplings for removable equipment.
Figure 11:
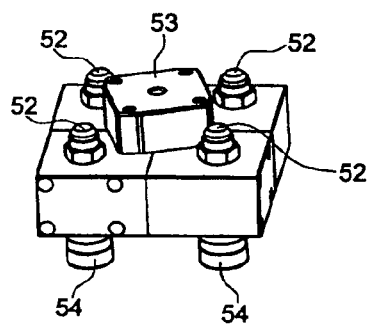
Figure 12:
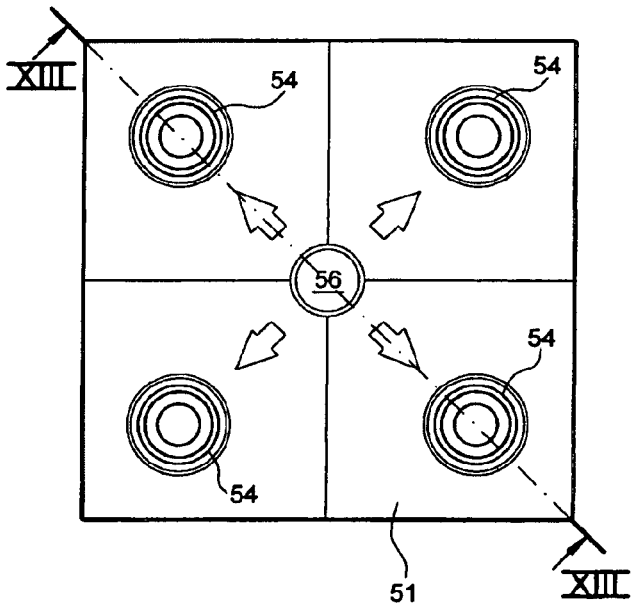
FIG. 12 shows an enlarged scale view from the side of the couplings of the hydraulic assembly in FIGS. 10 and 11.
Figure 13:
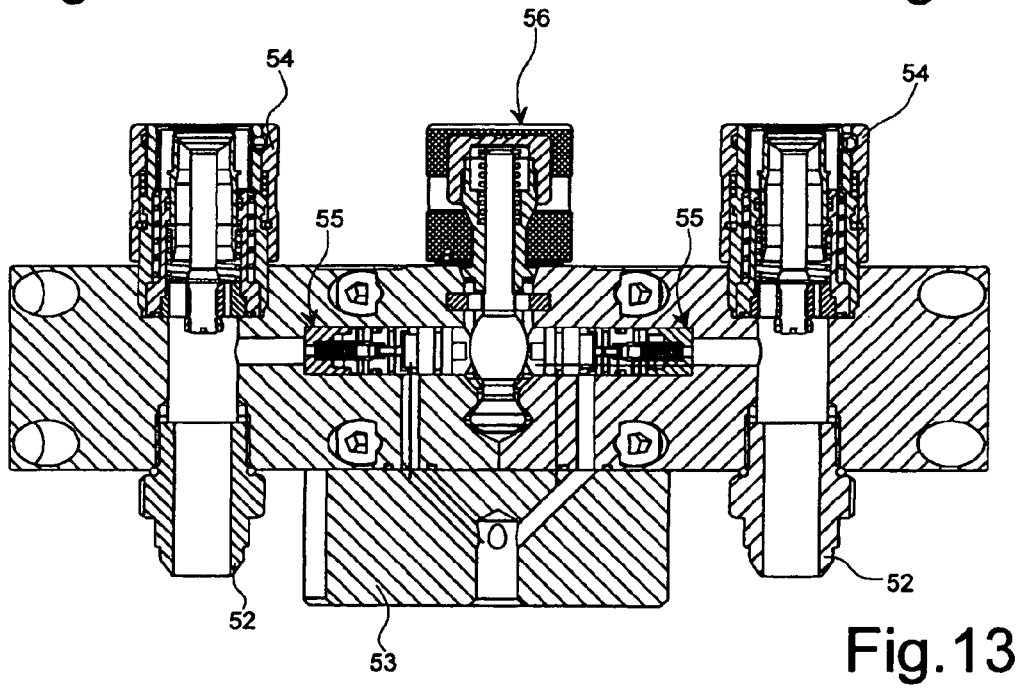
FIG. 13 shows a section view of the hydraulic assembly along line XIII-XIII in FIG. 12.

The valve assembly 3, shown externally in FIG. 6 and internally in FIGS. 4, 8 and 9, comprises an external body 20, within which two pressure discharge valves 21 and 22 are housed, which communicate with the above the inputs 14 and 15 and outputs 18 and 19 and therefore with the internal passages 12, 13, 16 and 17 of the one-piece body 1.

Each of the two valves 21 and 22 is formed as shown in FIG. 7, that is it comprises a valve body 23 provided with an input 24 and an output 25, respectively connected with the inputs 14 and 15 and with the outputs 18 and 19 of the valve assembly 3, as well as an axial passage 26 for the communication between the input 24 and the output 25, a stopper 27 which is axially mobile between a closed position of the axial passage 26 in virtue of a gasket 28 (FIG. 8) and an opening position of the axial passage 26 (FIGS. 4, 7 and 9), a spring 29 biasing between a closing cap 30 of the housing compartment of the valve in the external body 20 and the stopper 27 to elastically push it in the closed position against the gasket 28 and finally an operating piston 31, which axially extends from the housing compartment of the valve and against which an end rod 32 of the stopper 27 rests by the effect of the spring 29.

Between the operating pistons 31 of the two valves 21 and 22, in a transversal compartment 33, a longitudinal rod 34 of a pressure discharge lever 35 is housed, which is rotatable around a transversal pin 36 from the resting position in FIG. 8, in which a rounded part 37 of the rod 34 remains distanced from the operating pistons 31 to allow the stoppers 27 of the two valves to remain in a closed position.

A sleeve 38 stressed by a spring 39 towards an internal shoulder 40 of the rod 34 is slidingly fitted on the rod 34, as shown in FIG. 8. An operating knob 41 is screwed on the front end of the sleeve 38. An elastically deformable hood 42 protects the input mouth 43 of the compartment 33, which is flared towards the outside to allow the positioning of the lever 35 in the tilted position in FIG. 9 or in an oppositely tilted position, from the entry of dust or other material, as will be explained hereafter.

During operation, when the pressure discharge lever 35 is stably held in the resting position of FIG. 8 by the elastically forced insertion maintained by the sleeve 38 in the housing compartment 33, both of the discharge valves 21 and 22 are closed so that the oil or other liquid coming from the pressure lines of the hydraulic circuit of the engineering vehicle directly passes from the linkages 4 and 5 to the couplings 7 and 8, which are normally closed.

To connect the equipment to the onboard hydraulic circuit of the engineering vehicle the hydraulic circuit itself must be discharged in advance.

As far as the pressure line connected to the linkage 4 is concerned, this may be obtained by operating by traction on the knob 41 of the pressure discharge lever 35 until the sleeve 38 is extracted from the compartment 33 against the bias of the spring 39 and by then rotating the lever itself around the pin 36 until the tilted position in FIG. 9 is reached, where it is held by the front engagement of the sleeve 38 with an edge of the input mouth 42 of the compartment itself.

The rounded portion 37 of the rod 34 thus axially pushes the operating piston 31 of the discharge valve 21, which in turn forces the axial sliding of the stopper 27 to the opening position of the valve, that is the communication position between the input 24 and the output 25 of the valve and thus between the internal passages 12 and 16 of the one-piece body 1. The pressure line connected to the linkage 4 is thus connected with the draining line connected to the linkage 6 with subsequent discharge of the feeding pressure. A hydraulic equipment may thus be connected to the onboard hydraulic circuit of the engineering vehicle by means of the feeding coupling 7 and, if required, by means of the draining coupling 9.

In a totally similar manner, the pressure discharge lever 35 may be shifted to a symmetrical position with respect to FIG. 9, so as to cause the opening of the valve 22 and the subsequent discharging of the pressure line connected to the linkage 5 and the similarly subsequent connection to an equipment to the coupling 8.

The pressure discharge lever 35 may then be shifted to the stable resting position in FIG. 8 to allow the feeding of the connected hydraulic equipment.

Reverse operations are performed before carrying out the disconnection of the removable equipment from the onboard hydraulic circuit of the engineering vehicle.

It is apparent that by arranging the hydraulic assembly of FIGS. 1-9 outside the engineering vehicle and near the mechanical attachment point of the removable equipment, the pressure discharge operations and the connection and disconnection of the removable equipment may be carried out conveniently and rapidly, thus saving in terms of time and costs.

FIGS. 10-13 show a hydraulic assembly of the same type as that in FIGS. 1-9, which may serve four pieces of equipment and for this purpose is provided with a one-piece body 51, four linkages 52 for pressure lines, a linkage 53 for the draining line, four rapid couplings 54 for controlled equipment, four discharge valves 55 and a pressure discharge lever 56.

The invention claimed is:

1. A hydraulic connection assembly with a pressure discharge control, positionable between an onboard hydraulic circuit of an engineering vehicle and a removable hydraulic equipment, comprising:

a one-piece body attachable on an outside of a hydraulic machine adjacent a hydraulic linkage and provided with at least one input hydraulic linkage connectable to a pressure line of the hydraulic circuit of the vehicle, at least one coupling suitable for connection with a feeding input of a removable equipment and a pressure discharge hydraulic linkage connectable to a draining line, at least one normally closed discharge valve positioned between said at least one input hydraulic linkage connectable to a pressure line and said pressure discharge hydraulic linkage connectable to a draining line and a pressure discharge control operable so as to cause the opening of said at least one normally closed discharge valve for the connection of said pressure line to the draining line for the discharge of the pressure existing in the hydraulic circuit of the vehicle, wherein said discharge valve is a sliding piston and said pressure discharge control includes a lever rotatable around a transversal axis between a stable resting position and a working position, wherein a side of said lever is capable of exerting an axial thrust on said sliding piston for the opening control of said valve, wherein said pressure discharge control comprises a rod rotatable around said transversal axis and is provided with a rounded portion adapted to axially push said sliding piston when said lever is shifted to the working position, and wherein said pressure discharge control comprises a sleeve positioned around said rod in an axially sliding manner against the thrust of an elastic means which is capable of holding said pressure discharge control in a position inserted within a housing compartment of said rod to firmly hold said rod in said resting position and a knob screwed on said sleeve for the traction of said sleeve from said compartment and the rotation of said rod in the working position.

2. A hydraulic connection assembly according to claim 1, wherein said sleeve has a front engageable with an edge of an input mouth of said compartment for holding said lever in the working position.

3. A hydraulic connection assembly according to claim 1, wherein said sliding piston of the discharge valve is capable of cooperating with a stopper capable of axially sliding against action of an elastic means to push said stopper axially in an opening position of said valve when said lever is shifted the working position.

4. A hydraulic connection assembly according to claim 1, wherein said at least one discharge valve is included in a valve assembly forming a body separate from said one-piece body and detachably attached thereto.

5. A hydraulic connection assembly according to claim 1, said at least one input hydraulic linkage includes two input hydraulic linkages connectable to pressure lines, said at least one coupling includes two couplings suitable for connection with feeding inputs for removable equipment, and said at least one normally closed discharge valve includes two normally closed discharge valves alternatively operable in the opening position by shifting said pressure discharge lever to respective working positions.

6. A hydraulic connection assembly according to claim 5, wherein said two input hydraulic linkages connectable to pressure lines, said two couplings suitable for connection with feeding inputs of removable equipment and said two discharge valves are arranged symmetrically with respect to said pressure discharge lever so that said pressure discharge lever is positionable in working positions arranged symmetrically with respect to the resting position.

7. A hydraulic assembly according claim 1, wherein said sliding piston of the discharge valve is capable of cooperating with a stopper capable of axially sliding against action of an elastic means to push said stopper axially in an opening position of said valve when said lever is shifted the working position.

8. A hydraulic assembly according to claim 1, wherein said sliding piston of the discharge valve is capable of cooperating with a stopper capable of axially sliding against the action of said elastic means to push said stopper axially in an opening position of said valve when said lever is shifted the working position.

9. A hydraulic assembly according to claim 2, wherein said sliding piston of the discharge valve is capable of cooperating with a stopper capable of axially sliding against the action of said elastic means to push said stopper axially in an opening position of said valve when said lever is shifted the working position.

10. A hydraulic assembly according to claim 1, wherein said at least one discharge valve is included in a valve assembly forming a body separate from said one-piece body and detachably attached thereto.

11. A hydraulic assembly according to claim 1, wherein said at least one discharge valve is included in a valve assembly forming a body separate from said one-piece body and detachably attached thereto.

12. A hydraulic assembly according to claim 2, wherein said at least one discharge valve is included in a valve assembly forming a body separate from said one-piece body and detachably attached thereto.

13. A hydraulic assembly according to claim 3, wherein said at least one discharge valve is included in a valve assembly forming a body separate from said one-piece body and detachably attached thereto.

14. A hydraulic assembly according to claim 4, said at least one input hydraulic linkage includes two input hydraulic linkages connectable to pressure lines, said at least one coupling includes two couplings suitable for connection with feeding inputs for removable equipment, and said at least one normally closed discharge valve includes two normally closed discharge valves alternatively operable in the opening position by shifting said pressure discharge lever to respective working positions.

15. A hydraulic assembly according to claim 4, wherein said at least one input hydraulic linkage includes four input hydraulic linkages connectable to pressure lines, said at least one coupling includes two couplings suitable for connection with feeding inputs of removable equipment and said at least one normally closed discharge valve includes four normally closed discharge valves alternatively operable in an opening position by shifting said pressure discharge lever to respective working positions.

16. A hydraulic connection assembly with a pressure discharge control, positionable between an onboard hydraulic circuit of an engineering vehicle and a removable hydraulic equipment, comprising:

a one-piece body attachable on an outside of a hydraulic machine adjacent a hydraulic linkage and provided with at least one input hydraulic linkage connectable to a pressure line of the hydraulic circuit of the vehicle, at least one coupling suitable for connection with a feeding input of a removable equipment and a pressure discharge hydraulic linkage connectable to a draining line, at least one normally closed discharge valve positioned between said at least one input hydraulic linkage connectable to a pressure line and said pressure discharge hydraulic linkage connectable to a draining line and a pressure discharge control operable so as to cause the opening of said at least one normally closed discharge valve for the connection of said pressure line to the draining line for the discharge of the pressure existing in the hydraulic circuit of the vehicle, wherein said discharge valve is a sliding piston and said pressure discharge control includes a lever rotatable around a transversal axis between a stable resting position and a working position, wherein a side of said lever is capable of exerting an axial thrust on said sliding piston for the opening control of said valve, and wherein said at least one input hydraulic linkage includes four input hydraulic linkages connectable to pressure lines, said at least one coupling includes two couplings suitable for connection with feeding inputs of removable equipment and said at least one normally closed discharge valve includes four normally closed discharge valves alternatively operable in an opening position by shifting said pressure discharge lever to respective working positions.

* * * * *